United States Patent [19]

Mandar et al.

[11] 4,393,855

[45] Jul. 19, 1983

[54] CORRECTING DEVICE FOR THE COMBUSTION OF ENGINES OF VEHICLES DURING TRANSITIONAL PHASES OF OPERATION

[76] Inventors: André Mandar, Creteil; Jules Fressard, Paris; Martine Mandar, Versailles, all of France

[21] Appl. No.: 220,040
[22] PCT Filed: Apr. 14, 1980
[86] PCT No.: PCT/FR80/00058
§ 371 Date: Dec. 11, 1980
§ 102(e) Date: Dec. 11, 1980
[87] PCT Pub. No.: WO80/02179
PCT Pub. Date: Oct. 16, 1980

[51] Int. Cl.³ .............................................. F02M 23/04
[52] U.S. Cl. ...................................... 123/587; 123/585
[58] Field of Search ....................... 123/585, 586, 587

[56] References Cited

U.S. PATENT DOCUMENTS

| 1,858,835 | 5/1932 | Mabee. | |
|---|---|---|---|
| 3,866,588 | 2/1975 | Nakada et al. | 123/587 |
| 4,196,709 | 4/1980 | Toryu et al. | 123/587 |
| 4,261,317 | 4/1981 | Kawamura | 123/587 |
| 4,278,063 | 7/1981 | Nakamura et al. | 123/587 |
| 4,290,403 | 9/1981 | Ziniades | 123/587 |
| 4,297,984 | 11/1981 | Kawabata | 123/587 |

FOREIGN PATENT DOCUMENTS

| 2838885 | 3/1979 | Fed. Rep. of Germany | 123/587 |
|---|---|---|---|
| 483481 | 7/1917 | France. | |
| 1525059 | 4/1968 | France. | |
| 305338 | 2/1929 | United Kingdom. | |
| 519242 | 3/1940 | United Kingdom. | |
| 1567601 | 5/1980 | United Kingdom | 123/587 |

Primary Examiner—Parshotam S. Lall
Attorney, Agent, or Firm—Thomas J. Greer, Jr.

[57] ABSTRACT

A device for correcting the combustion of internal combustion engines, in particular automobile engines, the internal combustion engine having an intake manifold, the device including a first sealed chamber directly connected to the intake manifold, a second sealed chamber separated from the first chamber by a diaphragm having a neutral position, the second chamber being connected to the first chamber through a passage for delaying transmission of pressure variations from the first chamber to the second chamber, a control device for reducing the fuel to air ratio of the air and fuel mixture, the control device being coupled to the diaphragm for activation by the diaphragm whenever the differential pressure between the first and second chambers exceed a first predetermined value and whenever the differential pressure exceeds a second predetermined value.

10 Claims, 19 Drawing Figures

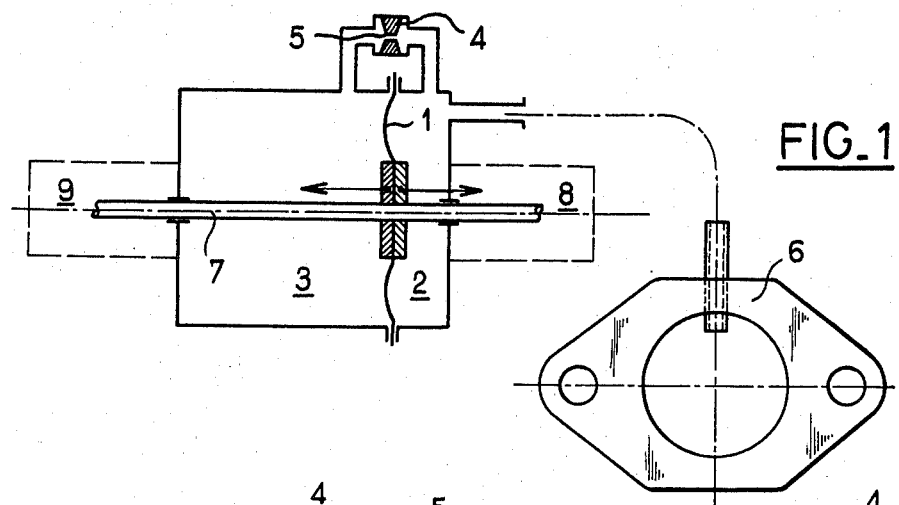
FIG_1
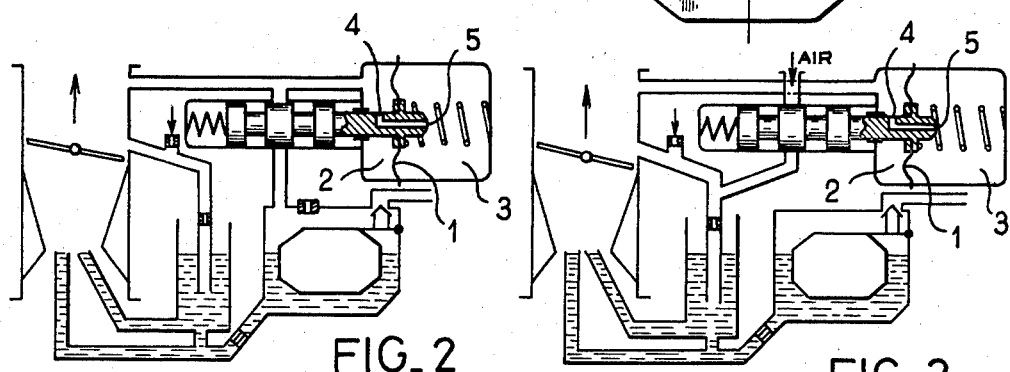
FIG_2  FIG_3
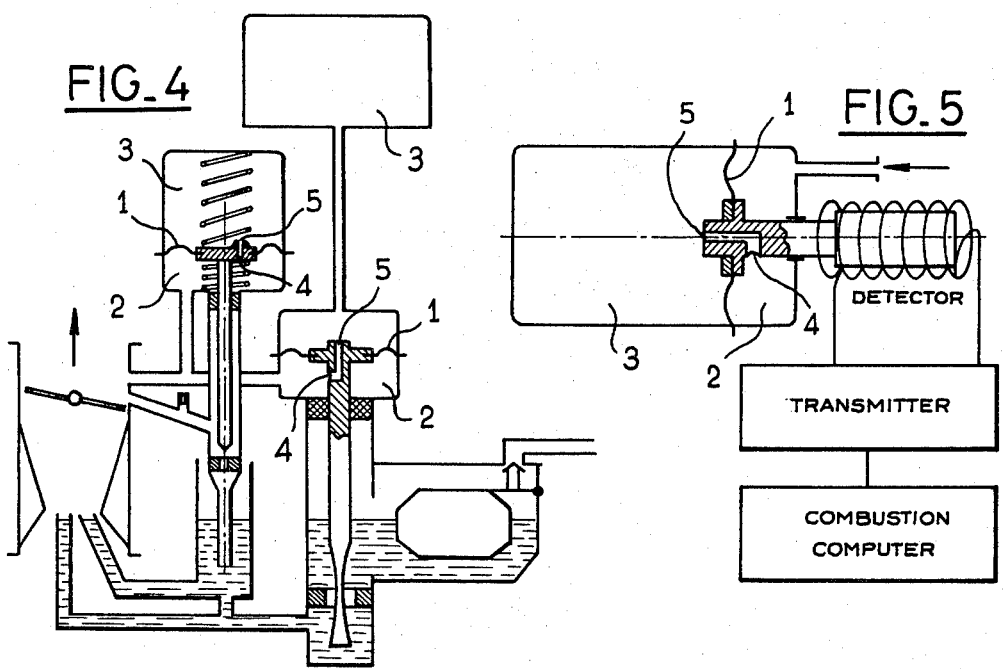
FIG_4  FIG_5

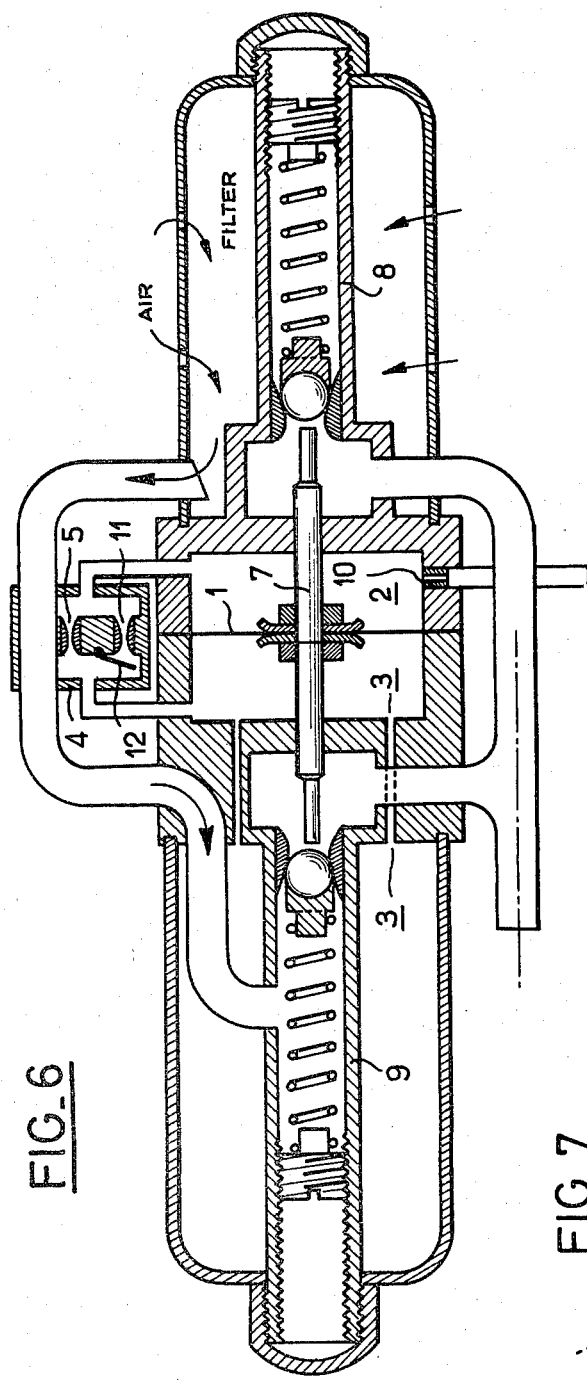
FIG_6
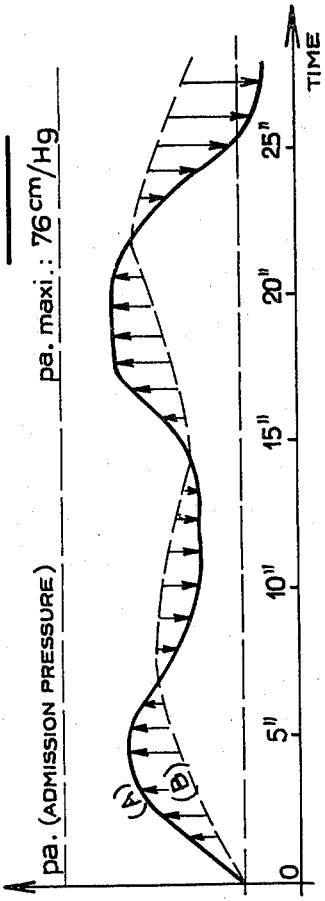
FIG_8
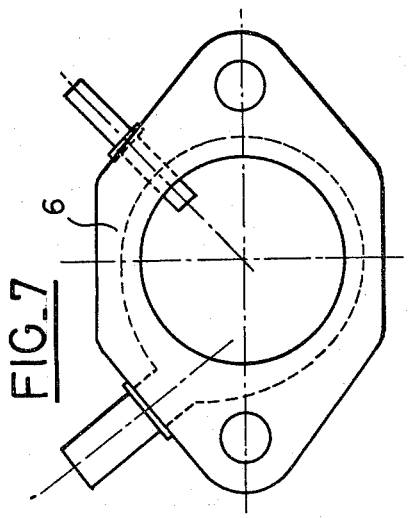
FIG_7

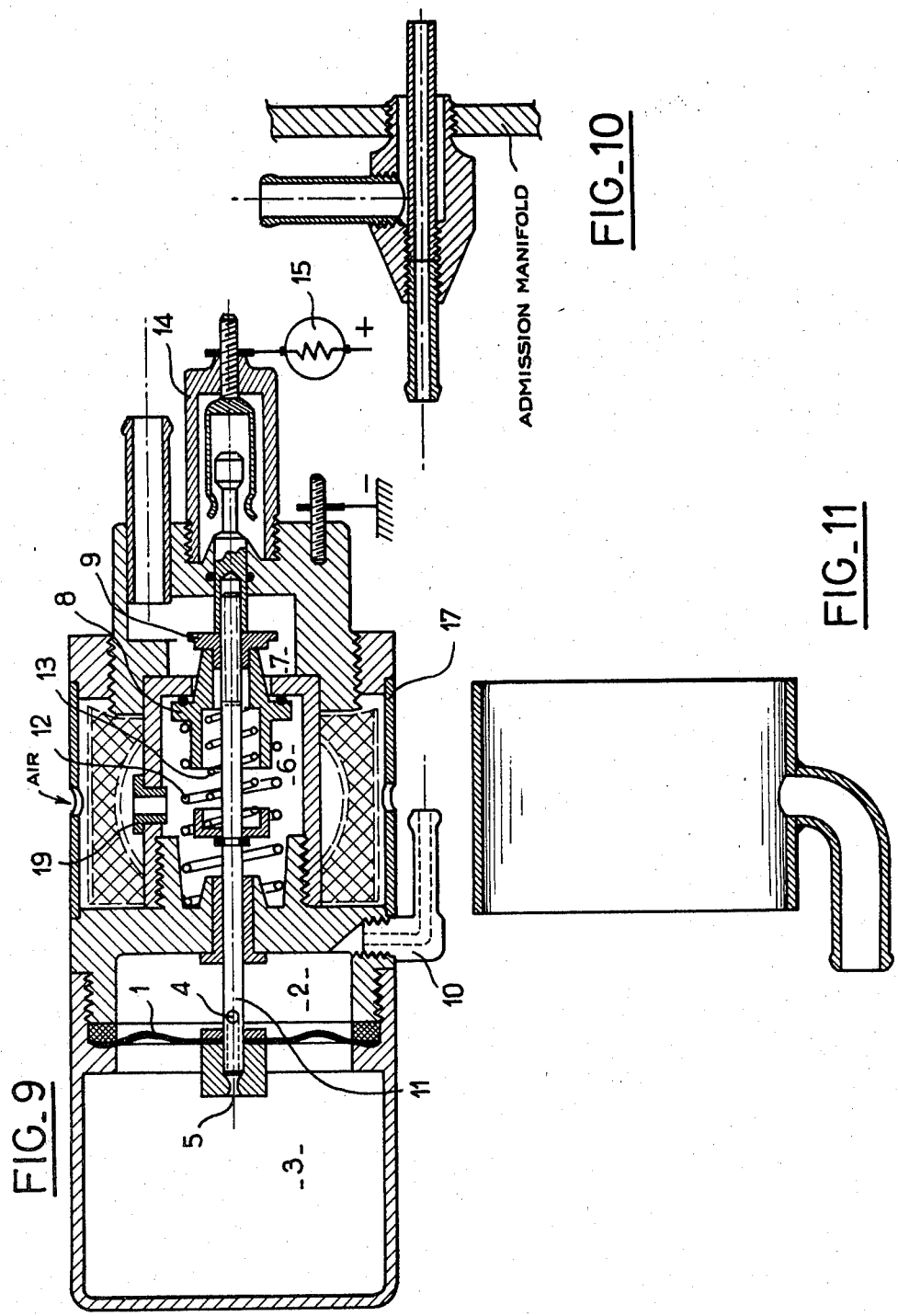

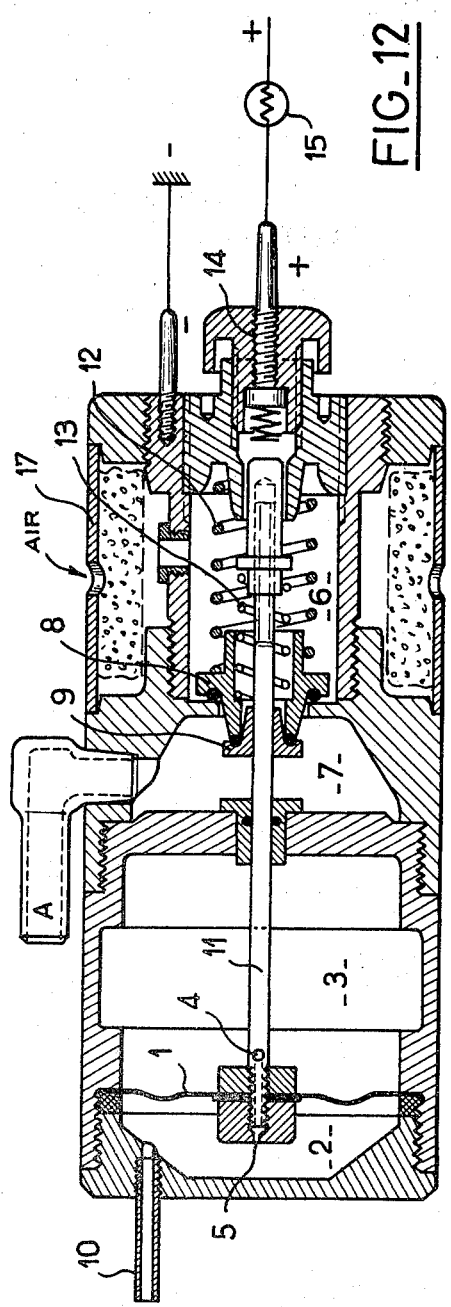
FIG_12
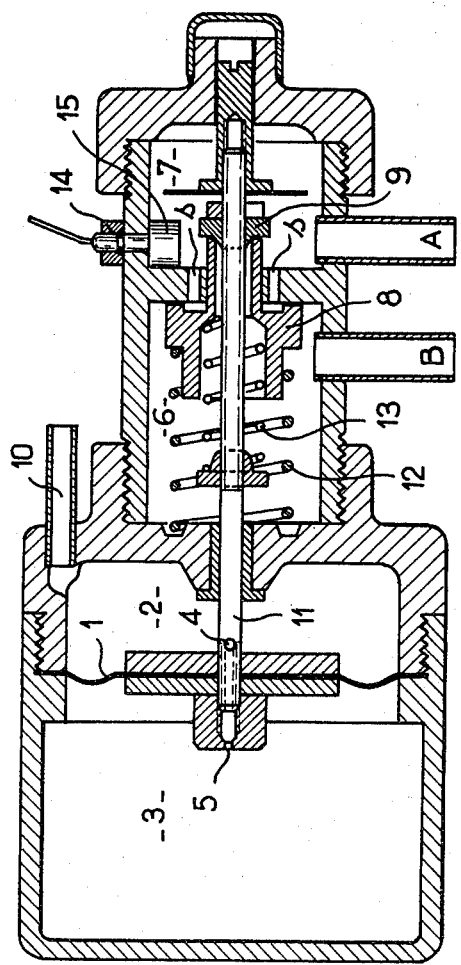
FIG_13

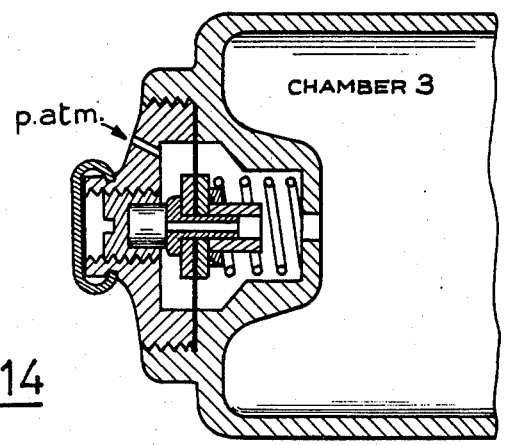
FIG_14
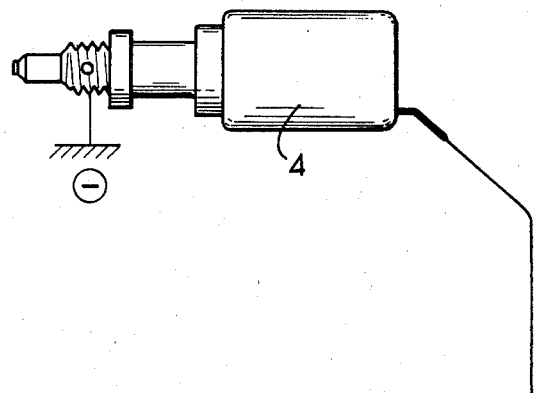
FIG_15

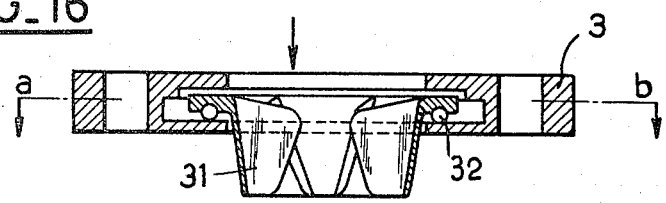
FIG_16
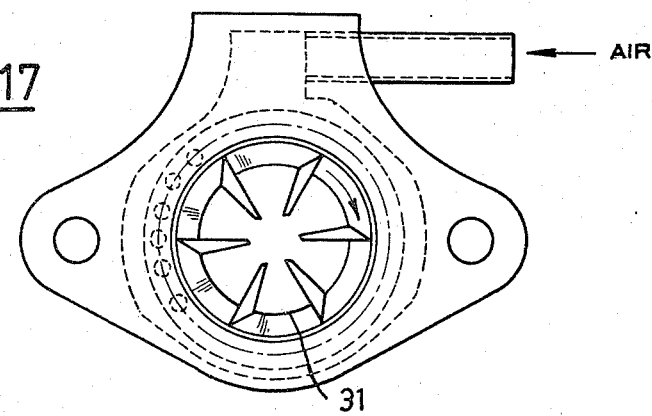
FIG_17
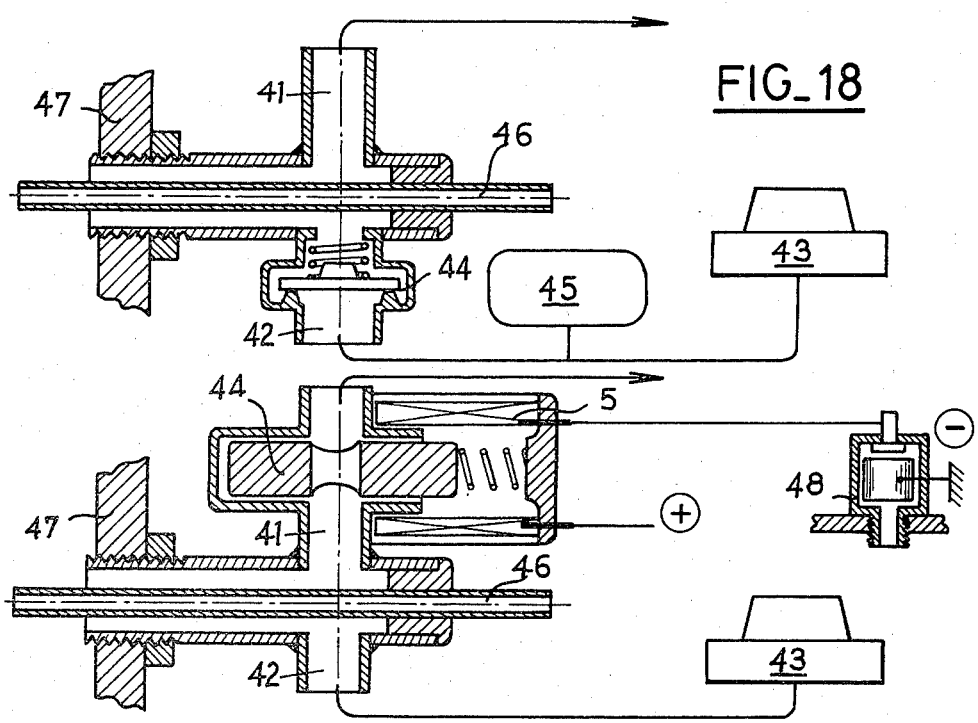
FIG_18
FIG_19

CORRECTING DEVICE FOR THE COMBUSTION OF ENGINES OF VEHICLES DURING TRANSITIONAL PHASES OF OPERATION

This invention concerns a correcting device for the combustion of engines of vehicles by reducing or suppressing the fuel flow and/or by the admission of additional air downstream of the carburettor, the admission of exhaust gas, crank-case gas, or a mixture of these gases, during the transitional phases of operation of the engine: accelerations, decelerations, and changes in the transmission ratios of the vehicle.

Connected to special accessories, it may be used as an anti-pollution device and fuel economizer intended for vehicles in service, but the device is easily adaptable as an initial fitment on any new vehicle and it may also be used to improve the operation during transitional phases of modern carburettors, or electronic ignition systems.

Devices of this type, which are at present used to reduce the consumption rate and pollution capacity of engines, do not take account fully of the substantial corrections to be made with regard to fuel consumption rates during transitional phases of operation of engines when the momentary consumption rate becomes particularly high; these transitional phases of operation occur during about 60% of the running time of vehicles in city traffic, which allows the device to operate usefully for 75 to 80% of this running time.

Certain new devices which are more developed and largely electronic are capable of correcting engine combustion effectively both during steady running and transitional operation, but these devices have the disadvantage of being complex and fairly difficult to adapt to vehicles in service, for combustion corrections are made on the basis of several engine parameters interpreted pneumatically and mechanically or electromechanically and electronically; position of the carburettor, admission pressure, speed of rotation of the engine, temperatures, carbon monoxide rate detection probe placed in the engine exhaust circuit.

The combustion correction device, in accordance with this invention, makes it possible to avoid the anomolies and disadvantages of combustion correcting devices at present known, while being simple and rational in design, and sufficiently effective to reduce substantially the consumption rate and pollution capacity of the vehicle concerned, particularly in an urban environment.

The correcting actions do in fact take place throughout the whole range of operations of the engine, but only during the transitional phases of these operations, for which current carburettors have no correcting system which may be properly adapted to the case of vehicles operating in city or suburban traffic.

By its mode of action in transitional phases of operation, the device in accordance with this engine is rational and its action involves no change in the "chart of the specific consumption rates of the engine" at steady speeds, optimised by the manufacture of the vehicle.

It makes no correction of the air-fuel mixture during no-load idling or the steady speeds of the engine, for which carburettors, at the present stage of the technique, are capable of giving the engine a carburetted mixture close on the optimum proportion during the steady periods of operation of the vehicle when the gear-box ratios specified are used, and practically ignoring the pressure and temperature of the ambient air.

The device in accordance with the invention is mainly characterized by its system of control of the correcting component, which is actuated not in terms of the value of the engine admission pressure, but in terms of the amount of the variations this pressure undergoes during the coarse of time.

Reference is now made to the drawings wherein:

FIG. 1 is a schematic view of the basic device of this invention connected to an intake flange.

FIG. 2 is a schematic vertical sectional view taken through a carburetor embodying another form of the device in accordance with this invention.

FIG. 3 is a schematic vertical sectional view similar to FIG. 2 showing another form of control device.

FIG. 4 is another schematic vertical sectional view taken through a carburetor showing yet another form of control device.

FIG. 5 is a schematic sectional view through a control device such as that of FIG. 1 for actuating a detector circuit.

FIG. 6 is an enlarged sectional view taken through still another form of control device.

FIG. 7 is a plan view of an intake flange for use with the control device of FIG. 6.

FIG. 8 is an admission pressure curve plotting pressure against time.

FIG. 9 is a sectional view through yet another form of control device.

FIG. 10 is a sectional view showing a special connector which may be mounted on an intake manifold for coupling the control device of FIG. 9 to the intake manifold.

FIG. 11 is a sectional view showing the connector by which the control devices may be coupled to a crankcase or exhaust manifold.

FIG. 12 is a sectional view through yet another form of control device.

FIG. 13 is a sectional view through yet another form form of control device.

FIG. 14 is a sectional view through a timing chamber with a pressure limiting valve incorporated therein.

FIG. 15 is a schematic of still another form of control device which incorporates an electrical contacter.

FIG. 16 is a sectional view through an intake flange incorporating a turbine.

FIG. 17 is a plan view of the intake flange and turbine of FIG. 16.

FIG. 18 discloses still another form of control device arrangement.

FIG. 19 discloses a still further form of control device arrangement.

The basic device in accordance with this invention is shown in FIG. 1.

It has a control diaphragm 1 separating two chambers 2, 3. The first chamber 2 is directly connected to the engine pressure in the intake manifold picked up at the level of admission manifold 6. The second chamber 3, called the timing chamber, which is large in volume, connected to chamber 2 by an interconnecting circuit 4 comprising a system for delaying transmission of the pressure between chambers 2 and 3, in particular a capillary jet or porous plug 5.

Diaphragm 1 may actuate, through control rod 7, a correcting component on the side of chamber 2, reference marked 8, (deceleration corrections) and a second correcting component on the side of chamber 3, reference marked 9 (acceleration corrections).

The two combustion correcting components 8 and 9 may each, depending on the type of device required, consist of at least:

a gradual air inlet or additional gas valve, the inlet of this valve being connected to air or gas supply, and the outlet being connected to the engine intake manifold by means of pipes; the valve being returned to its seat in the closed position by a spring, as shown in FIG. 6.

a valve allowing the connecting of the vacuum in the engine intake manifold to the float chamber of the carburettor so as to reduce more or less the fuel flow from the jets during decelerations and possibly accelerations of the engine; the float chamber is then connected to atmospheric pressure by a jet, the gauge of which is properly matched to the valve delivery rate. An embodiment of this mode of control is shown in FIG. 2.

an air inlet valve allowing the connecting of atmospheric pressure to the channel of the carburettor idling system, in order to being about a partial or total cut-out of the flow rate of the pilot jet during engine decelerations and possibly accelerations; the atmospheric air enters the idling passage of the carburettor through a connector, at the level of this passage, at the level of the jet, or the idling richness adjusting needle. An embodiment of this mode of control is shown in FIG. 3.

a transmission element to act directly on the position of a correcting needle placed in one or more of the carburettor jets (pilot jet, starting jet or recovery system flow rate jet) in order to correct the flow rate of the jet or jets concerned, during decelerations and accelerations. An example of this mode of action is shown in FIG. 4.

a remote electric transmission element to give an input signal during a transitional phase of operation of the engine to any conventional or electronic ignition system, where a higher or more reliable performance is required, during accelerations and decelerations and possibly to ensure that the engine is kept precisely at steady speed, making it possible in addition to reduce the consumption rate by suppression of the phenomenon of hunting. The remote electric transmission element constituting the control component of the device in accordance with the invention may, depending on the case concerned: be a simple electrical contactor for the "all or nothing" corrections or, for gradual combustion corrections a potentiometer, a variable magnetic resistance transmitter. An embodiment of the control is shown in FIG. 5.

The amount of each correction made, or of the signal transmitted by the correcting component of the device in accordance with this invention, depends on the load transmitted by the diaphragm and this load, as well as its period of action, are a direct function of the amount of the accelerations or decelerations undergone by the engine and the vehicle, which gives us the following:

Load transmitted by the diaphragm = $f(dpa/dt . K.S.)$
in which
dpa is the amplitude of the variation in intake pressure at the time of acceleration or deceleration,
dt is the duration of the development of the amplitude dpa
K is the timing coefficient of the device which depends particularly on the volume of chamber 3 and the cross-section of the passage of jet 5.
S is the useful surface area of the diaphragm.

As an example FIG. 8 is a variation curve for the engine intake pressure plotted against time.

The variations in this pressure, as represented by curves A and B, cause corresponding variations in pressure in chamber 3, staggered in time, in accordance with the value of coefficient K. These two curves highlight the differences in pressure which exist in the course of time between chambers 2 and 3 and which cause the resultant loads in one direction or the other on the correcting component of the device.

The device is therefore certainly in a position to effect the combustion corrections in transitional operating phases in proportion to the amount of the engine accelerations and decelerations on the vehicle concerned, and in the same way perhaps make it possible to control the steadiness of the engine at steady speeds.

The device in accordance with this invention is capable of being regulated or set to a standard cycle, representative of city or suburban traffic for the country or continent concerned. For example, a typical running cycle, the Federal Cycle for the U.S.A., etc.

In fact, these cycles give the speeds reached on average by car drivers in terms of the city or suburban running time for the low gear ratios used in this case, which is where combustion corrections are most needed.

Now, these cycles may easily be translated into admission pressure in relation to time and it is then possible to see that the new cycles obtained are almost identical for the vehicles of neighboring cubic capacity. Thus these cycles are similar for different vehicles of cubic capacities between 1000 and 1500 cm3.

The devide of this invention may therefore be timed for a large family of specific vehicles so as to optimise the necessary combustion correction actions for the cycle most representative of average city or suburban traffic-cycle ECE 15 for example for Europe- A complete representation of the ECE 15 cycle in the form of admission pressure plotted against time, and its representation in the form of momentary consumption rate resulting from computer simulations, makes it possible to show up the fact that the timing to be achieved for optimum use of the device in accordance with this invention, is very slightly different for accelerations and decelerations.

For city cycle ECE 15, this timing is approx.:
6 to 7 seconds for decelerations, and 4 to 5 seconds for accelerations.

This requirement is achieved by a double interconnecting circuit between chambers 2 and 3 of the device, which then has 2 capillary jets, one of them being fitted with a small non-return valve having very slight inertia, and which may consist of a flexible diaphragm which is applied to one of the two faces of the jet. During acceleration, connection between chambers 2 and 3 is established by the two jets whilst during deceleration, this connection is made only by the jet which is not fitted with the non-return valve.

In the following paragraphs, the invention is described in greater detail by means of the drawings showing the most significant and simplest embodiments.

FIG. 6 shows a combustion correcting device in accordance with the invention operating through the admission of additional air, or gas during accelerations and decelerations. Chamber 2 of the control system is connected in this case to a single turbulent flange, FIG. 7, inserted between the carburettor and the engine pressure admission manifold by means of a small flexible pipe. Jet 10 makes it possible to damp the fluctuations in admission pressure transmitted to chamber 2 in particular during low engine speeds. The interconnecting system 4 between chamber 2 and chamber 3 is duplicated and includes capillary jet 5 and capillary jet 11 fitted with a non-return valve 12 so as to give a higher rate of timing during deceleration than during acceleration.

The combustion correcting components 8, for decelerations, and 9 for accelerations, each consist of a ball valve closed by a calibrated spring.

In the case shown, it is the air which ensures combustion correction by impoverishment or a reduction in the strength of the air-petrol mixture (dilution of the air-fuel mixture and a drop in the vacuum in the admission manifold, which reduces the fuel flow from the jets).

During engine accelerations, the increase in intake pressure displaces the diaphragm on the side of chamber 3 and the value of component 9 opens to allow the passage of filtered air towards turbulence inducing device 6.

During decelerations, the reduction in admission pressure displaces the diaphragm on the side of chamber 2. The valve of correction component 8 opens to allow the passage of additional air to correct the air-fuel mixture.

A second version of the device operating by the admission of air or gas is shown in FIG. 9. In this version a single correcting component with two valves is arranged on the side of chamber 2 of the control system and the interconnecting or delaying circuit between chamber 2 and chamber 3 is constituted by control rod 11 and has only a single capillary jet 5, but this circuit may also be duplicated as previously described. Control diaphragm 1 consists of a diaphragm made of flexible material.

During the deceleration phase, the diaphragm moves towards chamber 2, control rod 11 drives valve 9 which is integral with it, compressing small return spring 13. Valve 9 being open, it allows the passage of correction air from chamber 6 to chamber 7, which interconnects with the engine intake manifold through the special connector, FIG. 10, installed on the manifold and which, in this case, replaces the turbulent flange.

During acceleration, the diaphragm moves towards chamber 3 and drives control rod 11 and valve 9 which, remaining applied against its seating, pushes and opens acceleration valve 8 by compressing spring 12.

For any admission of gases other than air, part 17 of the air filtering chamber and the filter are replaced by the part shown in FIG. 11, the connector of which is connected to a circuit which takes in the crank-case or exhaust gases again.

Depending on the vehicle model, jet 19 limits the flow rate of air or gas for correcting combustion.

In this second version of the device, shown in FIG. 9, an electric contactor system 14, controlled by the movement of the control rod of the valves is installed. This contactor system brings about the earthing of a circuit comprising a control light 15, located on the instrument panel of the vehicle, when the device enters into operation with effect from a certain acceleration or deceleration value threshold. This control light is intended to act as an operating indicator for the device and above all as an indicator to assist in the economic driving of vehicles.

For this special signalling function, one of the electric alarm lights which already exist on the vehicle may be used (e.g., hand brake alarm light). In this case, contact 14 closes the circuit between the alarm contactor selected and earth which makes installation of the signalling circuit of the device simple and immediate without compromising the original function of the alarm circuit concerned.

FIG. 12 shows a third version of the device, the various constituent elements of which are similar to those of the previous version.

The correcting component with two valves, identical to the previous ones, is located on the side of chamber 3 of the control system and the signalling system, more easily adjustable, monitors only the substantial accelerations which must be avoided for economic driving.

Finally, FIG. 13 shows a last version of the device operating through the admission of air, crank-case gas or exhaust gas, production of which seems to be the most reliable and most economic for the vehicles at present on the roads. It is distinguished from the second and third versions described above by the provision of the valves which have no gasket. In addition, the acceleration valve operates in the "all or nothing" mode with no substantial gradualness of the flow rate in terms of its opening movement. It connects the air or gas flow rate from chamber 6 to chamber 7 through the peripheral holes, the cross-section and number of which are adapted to the type of vehicle on which the device is installed. The electrical signalling system of the control light on the instrument panel for economic driving has a contactor disc 15, the neutral position of which may be adjusted and two fixed contact terminals 14 (of which one alone is shown in FIG. 13). The casing forming chambers 6 and 7 of the air or gas distribution component, is preferably made of insulating plastic. The distribution component is connected to the engine manifold, fitted with a turbulent flange, FIG. 7 or a special connector, FIG. 10, by means of two flexible pipes, one having a large cross-section ending in tube A (intake) and another having a small cross-section ending in chamber 2; tube B is used to connect the filtered air or gas circuit to the device by means of a pipe having a large cross-section.

When decelerations persist beyond 10 seconds in the case of negative slopes, hill descents, a total system of decelerations may be added to the devices shown in FIGS. 6, 9, 12 and 13, consisting of:

either a super vacuum valve placed on the additional air or gas distribution circuit, either single or with a control diaphragm, connecting the air or the gas to the engine intake manifold.

or a valve placed between timing chamber 3 and atmospheric pressure. This valve, shown in FIG. 14, limits the minimum value of a pressure reached in this chamber to a value close to the value of the engine intake pressure at the time of no-load idling.

During starting of the engine, the atmospheric pressure prevailing in timing chamber 3 of the devices shown in FIGS. 6, 9, 12 and 13 abnormally causes the full opening of deceleration valve 9 for too long a period of time. In fact in chamber 3 there is the absolute pressure of 760 mm/Hg at the time the engine starts and in chamber 2 a pressure close on 190 mm/Hg, corresponding to no-load idling; it therefore ensues from this that the diaphragm is stressed to the right by a resulting pressure of 570 mm/Hg which can only disappear gradually through jet 5 taking too long a period of time which might cause difficulties to starting of the engine in the absence of a choke. To overcome this disadvantage the device may be fitted with a single overpressure valve, between chambers 2 and 3, limiting to 190 to 250 mm/Hg the maximum difference which may exist between chamber 3 and chamber 2.

The devices shown in FIGS. 6, 9, 12 and 13 may be fitted with an electrical contactor intended to cut out electromagnetically the flow rate from the carburettor pilot jet during decelerations (total or partial elimination of the flow rate).

FIG. 15, shows an embodiment of the electrical contactor placed in chamber 7 of the device shown in FIG. 13. In this diagram it is possible to identify air distribution or gas distribution chambers 6 and 7 of the component, already shown in FIG. 13. Adjustable contactor disc 1 ensures, in the neutral position, and in the acceleration position, the closing of the circuit by means of fixed contact terminals 22 and 23. (The contactor of the circuit of the control light which is intended to assist in economic driving, is not shown here).

When the device enters into the deceleration phase, disc 1 is actuated by the control rod of the device and the circuit is open. In this condition, pilot jet 4 installed on the carburettor (choke type jet with solenoid and needle) is no longer fed by the vehicle voltage and closes, the petrol flow is cut out.

This system for cutting out the fuel flow during deceleration, using the pilot jet, is different from the existing system by virtue of the fact that its control is effected on the basis of the timed load of the control system of the device (timing load=function dpa/dt K). Now, the other known devices act either when the vacuum in the intake manifold whih is a value greater than that of no-load idling, which limits operation solely to total decelerations (gas butterfly valve shut) or through an electronic device capable of causing a differential (dn/dt for example, n being the speed of rotation of the engine).

Installation of the function "cut out of the pilot jet during deceleration" on the device covered by this invention requires the fitment in the electric circuit controlling the jet of an electromagnetic or electronic relay shown in FIG. 15, reference mark 25, allowing the supply of voltage of the jet when the speed of rotation of the engine is between 0 and 1200 RPM, for example.

This contactor relay facilitates in particular the return to the no-load idling speed of the engine following a substantial deceleration followed by braking of the vehicle for, in this condition, the contactor disc of the device does not have the time to find its circuit closure position again.

The electromagnetic or electronic relay is inserted in a box 5 with the known electronic circuits which produce the opening signal for this relay, afer approximately 1200 RPM of the engine. The relay box may comprise in particular:

1 circuit for shaping the pulses coming from the breaker of the engine ignition system 1 integrator giving a voltage proportional to the frequency of the pulses 1 threshold voltage detector with control potentiometer the relay, or switching circuit ensuring live supply to the pilot jet for frequencies between 0 and 40 Hz./seconds (case of a 4 cylinder engine—between 0 and 1200 RPM).

Beyond an engine range of 1200 RPM (fixed threshold) the relay is open and the contactor inserted in the device in accordance with this invention may alone ensure control of the pilot jet delivery rate: a delivary rate which is guaranteed at steady engine speed and during acceleration, and which is cut out during deceleration over the whole range of engine operation.

In this mixed version of the device, operating through the admission of additional air or gas, and by cutting out the pilot jet, the air or gas delivery rate during decelerations may be greatly reduced. Which eliminates any difficulties as regards the starting of an engine fitted with the device, and which substantially increases its effectiveness as a fuel economiser and its capacity to reduce the pollution agents (in particular the HC).

The effectiveness of all the versions of the device in accordance with this invention may be increased by the use of a flange with turbulence turbine, a diagram of which is given in FIGS. 16 and 17. This flange is placed between the carburettor and the engine intake manifold. It is characterised by the fact that turbine 21 is located in the centre of the flange by a ballbearing, preferably of the thrust bearing type 32, also accomodated in flange 33. By this arrangement, only turbine 31 is located in the flow of the carburetted mixture supplied by the carburettor.

The turbine and the moving part of the ballbearing have a certain degree of rotational inertia, sufficient to damp the fluctuations in speed of the gaseous air-pilot flow, in order to limit the double suction effect of the petrol at the level of the carburettor, and to improve distribution of the carburetted mixture in the engine intake pipes. The flange with turbulence turbine 33 is also characterized by the fact that the additional air or the gas for correcting combustion passes through this flange and the spaces between the balls of the bearing 32 to cool the latter and possibly lubricate it: case of admission of air and crank-case gases.

The various versions of the device in accordance with this invention may be connected to the engine admission manifold without using turbulence flanges, by one or two normal connectors which may exist on this manifold, or connectors specially fitted for the use of the device. In the latter case, three-way connectors may be used, in accordance with the invention, as shown in FIGS. 10, 18 and 19.

In the case of FIG. 18, channel 41 is directly connected to the correcting component of the device and channel 42 may be used to transmit the vacuum to servo-brake 43 of the vehicle through a non-return valve 44 making it possible to keep the maximum depression in the servo-brake for as long as possible during the starting of the device and in particular during decelerations. To achive this result to the best possible degree, a vacuum reservoir 45 is placed between valve 44 and servo-brake 43. The third channel 46 consists of a plunger tube which enters intake manifold 47. This type of 3-way connector is designed for certain countries where the braking standards for vehicles are less demanding than European standards. Hence the possible replacement in this case of the connector of the servo-brake with the 3-way connector covered by the invention; for this connector, valve 44 and reservoir 45 may be arranged at other points on the "connector 42-servo-brake 43" line. In the case of FIG. 19, channel 41 is connected to the correcting component of the device through a valve 44 controlled by a solenoid 45 which cuts out or restricts channel I when braking pressure contact 48 of the vehicle is shut: start of vehicle braking.

This second type of 3-way connector is designed in particular for countries where the braking standards for vehicles must be applied in full. It may therefore easily replace the servo-brake connector which already exists on vehicles on the road, which allows immediate fitment of the device without removing any engine parts: carburettor or intake manifold.

It is also possible to use a 3-way connector to take the place of the crank-case gas re-intake connector downstream of the carburettor, which is ordinarily installed on the engine admission manifold.

In this case, channel 41 is connected to the correcting component, channel 42 is used to re-establish the original fitment of a crank-case re-intake connector and a third channel including the plunger tube 46 is connected to chamber 42 of the device.

It is also possible to install on the engine intake manifold two or more different connectors arranged symmetrically either side of the centre line of the carburettor so that the additional air or gas allowed into the manifold may be controlled by flow jets fitted on the connectors in order to take account of the variatons in richness of the mixture which exist between the engine cylinders.

Contactor relay 25, in FIG. 15, required for shipment of the "suppression of the pilot jet during decelerations" function of the device in accordance with this invention may perhaps be replaced by a single relay-contactor, closure of which is ensured by making the vehicle braking indicator circuit live. In this way the choke-type jet is supplied with voltage and delivers normally as soon as the vehicle is slowed down by braking and the vehicle braking contactor is shut.

The device in accordance with this invention may also be controlled by the static or dynamic pressure which prevails upsteam of the carburettor gas butterfly valve where it is mainly a matter of making the corrections provided to the normal running system of the carburettor or to the high speeds of the vehicle.

We claim:

1. A device for correcting the combustion of internal combustion engines which are subjected to frequent changes in speed of rotation and loads, in particular automobile engines, each internal combustion engine having an intake manifold for directing a mixture of air and fuel to an engine comprising a first sealed chamber directly connected to said intake manifold, a second sealed chamber separated from the first chamber by a diaphragm having a neutral position, said second chamber being connected to the first chamber, through passage means for delaying transmission of pressure variations from the first chamber to the second chamber, control means for reducing the fuel to air ratio of said air and fuel mixture, said control means being coupled to said diaphragm for activation by said diaphragm whenever the differential pressure between the second and first chambers exceeds a first predetermined value and also whenever the differential pressure between the first and second chambers exceeds a second predetermined value, whereby the fuel to air ratio is reduced during acceleration and deceleration transitory phrases of the engine.

2. A device according to claim 1 including electric control means, said diaphragm acting on said electric control means which controls progressively said control means for reducing fuel to air ratios.

3. A device according to claim 1, wherein there is an air inlet, a distribution valve between said air inlet and said intake manifold, said diaphragm being attached to a rod and said rod being attached to said distribution valve for connecting said intake manifold to said air inlet when said diaphragm is displaced one one side or the other from said neutral position.

4. A device according to claim 1, wherein there is an air inlet, first and second valves between said air inlet and said intake manifold, said diaphraph being attached to a rod and said rod controls the opening of said first valve when said diaphragm is displaced in one direction and the opening of said second valve when the diaphragm is displaced in an opposite direction, both of said valves being capable, when opened, of connecting said intake manifold to said air inlet.

5. A device according to claim 1, wherein there is a carburetor having a constant level tank and a by-pass conduit between said intake manifold and said constant level tank, and said diaphragm, when displaced in either one or the opposite direction from said neutral position, controls the opening of said by-pass conduit between said intake manifold and said constant level tank.

6. A device according to claim 1, wherein there is a carburetor having an idling circuit including an emulsion channel, and a valve for admitting air to said emulsion channel, and said diaphragm, when displaced in either one or the opposite direction from said neutral position, controls the opening of said valve for admitting air into said emulsion channel.

7. A device according to claim 1, wherein said passage means comprises a porous plug.

8. A device according to claim 1, wherein said passage means includes a nozzle of small diameter.

9. A device according to claim 1, wherein said passage means includes a first passage and a second passage, said second passage having a unidirectional valve which remains closed when pressure in the second chamber exceeds pressure in the first chamber, and which is opened otherwise.

10. A device according to claim 1, wherein a turbine is located in said intake manifold, said turbine being centered inside a flange having a ball-bearing external to the intake manifold and said turbine having several blades at a slight incidence angle with respect to a central axis of the intake manifold and having an inertia sufficient for damping the fluctuations in speed and pressure of the fuel and air mixture in said intake manifold.

* * * * *